(No Model.) 2 Sheets—Sheet 1.
J. T. BEDFORD.
PHOTOGRAPHIC CAMERA.
No. 436,012. Patented Sept. 9, 1890.
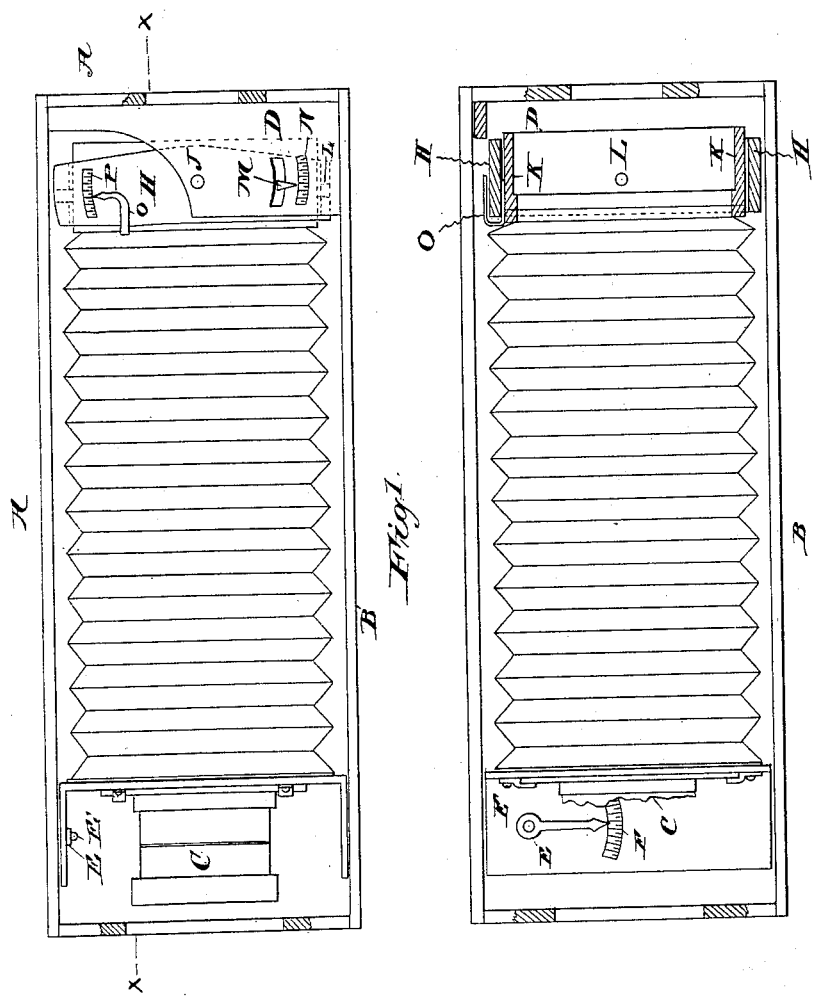
WITNESSES:
INVENTOR
Joseph T. Bedford
BY
Phillips Abbott
his ATTORNEY (No Model.) 2 Sheets—Sheet 2.
J. T. BEDFORD.
PHOTOGRAPHIC CAMERA.
No. 436,012. Patented Sept. 9, 1890.
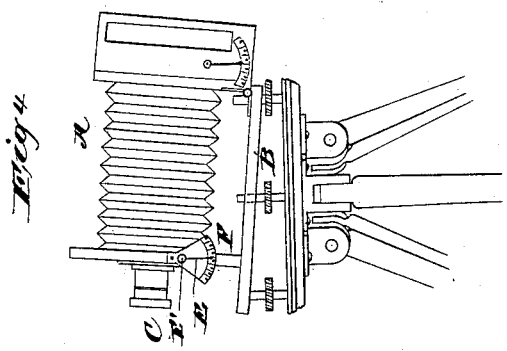
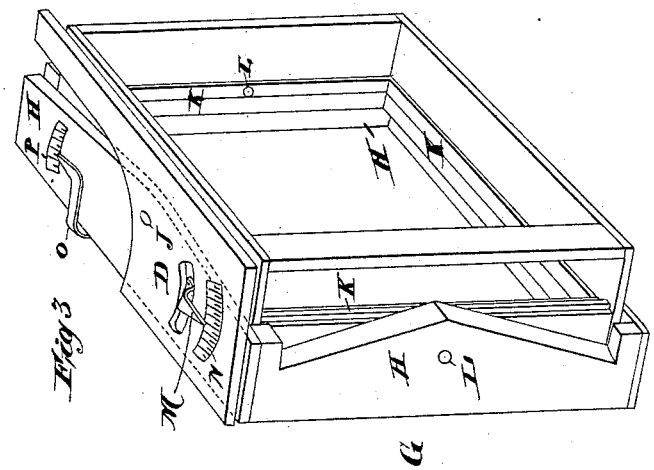
WITNESSES:
INVENTOR
Joseph T Bedford
BY Phillips Abbott
his ATTORNEY

UNITED STATES PATENT OFFICE.

JOSEPH T. BEDFORD, OF NEW YORK, N. Y., ASSIGNOR TO E. AND H. T. ANTHONY & COMPANY, OF SAME PLACE.

PHOTOGRAPHIC CAMERA.

SPECIFICATION forming part of Letters Patent No. 436,012, dated September 9, 1890.

Application filed July 15, 1889. Serial No. 317,556. (No model.)

*To all whom it may concern:*

Be it known that I, JOSEPH T. BEDFORD, a citizen of the United States, and a resident of New York city, in the county of New York and State of New York, have invented certain new and useful Improvements in Photographic Cameras, of which the following is a specification.

My invention relates to improvements in photographic cameras, whereby the angle of the base or body of the camera relative to a horizontal plane may be quickly and accurately ascertained when photographing high or elevated objects, and also the desired angle of the plate-holder, or in other words that of the surface of the sensitive plate, may be easily, quickly, and accurately obtained.

The invention consists, broadly stated, in attaching to the camera and to the frame which supports the sensitive plate certain indicators, whereby the angle of the base or body of the camera will be automatically registered, and whereby also the proper angle of the sensitive plate may be quickly secured, using the automatic index on the camera proper as a basis of calculation for determining the angle of the sensitive plate.

In the drawings, the same reference-letters indicate the same parts in all the figures.

Figure 1 illustrates a top view of one form of camera partly in section, showing my invention attached. Fig. 2 illustrates a side view of the apparatus, as shown in Fig. 1, taken on the line *x x*, also partly in section. Fig. 3 illustrates a perspective view of the frame within which the plate-holder is held, this frame being located at the rear of the camera. Fig. 4 illustrates the invention as attached to a back-swing camera mounted on a tripod.

A is the camera-body. B is the base or bottom thereof.

C is the lens-tube, and D is the frame at the rear of the camera, within which the supplemental frame for the plate-holder is pivoted.

E is a gravity-acting pendulum-like indicator or pointer. It is pivoted at E' to the side of the forward end of the camera, which is of course secured to the base of the camera B and at right angles thereto.

F is an indicator-plate having degrees or other suitable indicia marked thereon.

G (see Figs. 1, 2, and 3) is a double or universally acting frame set in the fixed frame D. It is composed of two parts, one H, which is pivoted to the side pieces of the frame D by pivots J, or their equivalents, and K is the other frame. It is located within the frame H and is pivoted to it at its opposite sides by pivots L or their equivalents, set at alternate sides as compared with the pivots J. Thus these frames taken together as a whole are capable of oscillation in two directions, which are at right angles to each other.

M is an indicator or finger attached to the outer frame H, and N is an indicator-plate attached to the frame D, with which this pointer coacts, and O is another indicator-finger attached to the inner frame K, and P is its coacting indicator-plate attached to the side of the outer frame H.

The operation of the apparatus as thus far described is as follows: The operator finds his object in any preferred manner, either with a "finder" attached to or employed with the camera, or in any other desired manner. When found, he notes the degrees of inclination of the base of the camera as indicated by the gravity-acting pointer E on the index F. He then makes such calculation as may be needful to give the plate-holder the same or a different angle, as he may prefer, and he then turns the plate-holding frame on its horizontal axis J or H, as the case may be, until the pointer M or O indicates on the indicator-plate N or P, as the case may be, that the desired angle has been secured. He then proceeds to take the picture, confident that the angle of the sensitive plate relative to the object is such as he wishes it to be. Whether the plate will be swung on the axes of the inner frame K or on those of the outer frame H, and also which of the indicating devices M and N or O and P are used, will depend on whether the picture is to be a horizontal or vertical one, and I provide my improved cameras with the double or universally acting frame above shown and described, in order that the camera may be used as indicated in either position.

In Fig. 4 I illustrate the invention as applied to the well-known "back-swing" cameras. The gravity-acting indicator at the forward end of the camera is the same as that before described. At the rear, however, I show it as substantially a duplicate of the indicating device of the forward end. It is shown as acting by gravity also. It is obvious that the indicators may be separate from the cameras and applied thereto when their use is desired. I wish it to be understood that I do not limit myself to the details of construction of the apparatus or any of its parts as shown and described, because it will be at once apparent to those skilled in this art that the construction, the operation, and the location of the indicating devices may be varied almost indefinitely and still the gist of my invention be employed; also, my invention may be used in connection with cameras of different construction than either of those shown.

Having described my invention, I claim—

1. A photographic camera having an indicator whereby the angle of the camera may be determined, and having also a movable frame which directly or indirectly holds the sensitive surface provided with an indicator, whereby the desired angle of the sensitive surface may be secured, substantially as set forth.

2. A photographic camera having an indicator whereby the angle of the camera may be determined, and having also a double or universally acting frame which directly or indirectly holds the sensitive surface provided with an indicator for each part of the double or universally acting frame, substantially as set forth.

Signed at Edinborough, in the county of Erie and State of Pennsylvania, this 6th day of July, A. D. 1889.

JOSEPH T. BEDFORD.

Witnesses:
WM. E. DRAKE,
CHAS. M. LILLIE.